United States Patent
Tanaka

(10) Patent No.: US 9,977,419 B2
(45) Date of Patent: May 22, 2018

(54) POSITION CONTROL APPARATUS, POSITION CONTROL METHOD, OPTICAL APPARATUS, AND IMAGING APPARATUS

(71) Applicant: CANON KABUSHIKI KAISHA, Tokyo (JP)

(72) Inventor: Shuya Tanaka, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 497 days.

(21) Appl. No.: 14/671,543

(22) Filed: Mar. 27, 2015

(65) Prior Publication Data

US 2015/0334310 A1    Nov. 19, 2015

(30) Foreign Application Priority Data

Mar. 31, 2014   (JP) ................................. 2014-073948

(51) Int. Cl.
G05B 19/19 (2006.01)
H04N 5/232 (2006.01)
(Continued)

(52) U.S. Cl.
CPC ............. G05B 19/19 (2013.01); G01B 21/00 (2013.01); G03B 3/10 (2013.01); G05B 11/32 (2013.01);
(Continued)

(58) Field of Classification Search
CPC .. G03F 7/70716; G03F 7/70725; G03F 7/709; G11B 7/0941; G11B 11/105761;
(Continued)

(56) References Cited

U.S. PATENT DOCUMENTS 5,504,407 A * 4/1996 Wakui ................. G03F 7/70716
                                                     318/568.17
5,511,930 A * 4/1996 Sato ........................ G03F 7/709
                                                     356/498
(Continued)

FOREIGN PATENT DOCUMENTS

JP          04-238509 A       8/1992
JP       2014033373 A    *    2/2014

*Primary Examiner* — Crystal J Barnes-Bullock
(74) *Attorney, Agent, or Firm* — Cowan, Liebowitz & Latman, P.C.

(57) ABSTRACT

A target generating unit outputs a target value signal of a control target, and a position encoding processing unit outputs a position detection signal of the control target. A PID compensator calculates a control amount for causing the control target to follow a target position based on a difference signal between the target value signal and the position detection signal, and outputs it to an adding unit. A disturbance estimation observer outputs the result of estimation of disturbance to the adding unit. The adding unit adds the control amount output of the PID compensator to the output of the disturbance estimation observer to calculate a total control amount. A storage unit stores a control amount during position control to a fixing position as an attitude difference correction amount, and the disturbance estimation observer performs disturbance estimation using a control amount obtained by subtracting a value stored in the storage unit during position control to a moving position from the total control amount.

17 Claims, 13 Drawing Sheets

(51) Int. Cl.
*G01B 21/00* (2006.01)
*G06K 9/60* (2006.01)
*G05D 3/12* (2006.01)
*G05B 11/32* (2006.01)
*G05B 13/04* (2006.01)
*G03B 3/10* (2006.01)
*G06T 7/80* (2017.01)
*G06T 7/70* (2017.01)

(52) U.S. Cl.
CPC .............. *G05B 13/04* (2013.01); *G05D 3/12* (2013.01); *G06K 9/605* (2013.01); *G06T 7/70* (2017.01); *G06T 7/80* (2017.01); *H04N 5/23296* (2013.01); *G03B 2205/0053* (2013.01); *G05B 2219/41368* (2013.01); *G05B 2219/42033* (2013.01)

(58) Field of Classification Search
CPC ........ G05B 11/42; G05B 13/04; G05B 19/19; G05B 19/195; G05B 2219/41145; G05B 2219/41368; G05B 2219/42033; G05D 3/12
See application file for complete search history.

(56) References Cited

U.S. PATENT DOCUMENTS

| | | | | |
|---|---|---|---|---|
| 5,933,397 | A * | 8/1999 | Yamashita | G11B 7/08517 369/44.28 |
| 6,191,844 | B1 * | 2/2001 | Ueda | G03F 7/70358 355/53 |
| 6,434,932 | B2 * | 8/2002 | Hara | F03G 7/065 60/527 |
| 6,542,917 | B1 * | 4/2003 | Watanabe | G06F 7/49989 708/605 |
| 6,628,576 | B1 * | 9/2003 | Watanabe | G11B 7/08505 369/30.15 |
| 6,668,202 | B2 * | 12/2003 | Makino | G05B 5/01 700/56 |
| 6,870,801 | B2 * | 3/2005 | Ikai | G11B 7/0941 369/44.32 |
| 8,064,810 | B2 * | 11/2011 | Okumura | G03G 15/0131 347/116 |
| 8,245,317 | B2 * | 8/2012 | Negishi | B82Y 35/00 73/105 |
| 8,805,556 | B2 * | 8/2014 | Saiki | G03F 7/70775 355/72 |
| 8,970,821 | B2 * | 3/2015 | Asano | G03F 7/70725 355/72 |

* cited by examiner

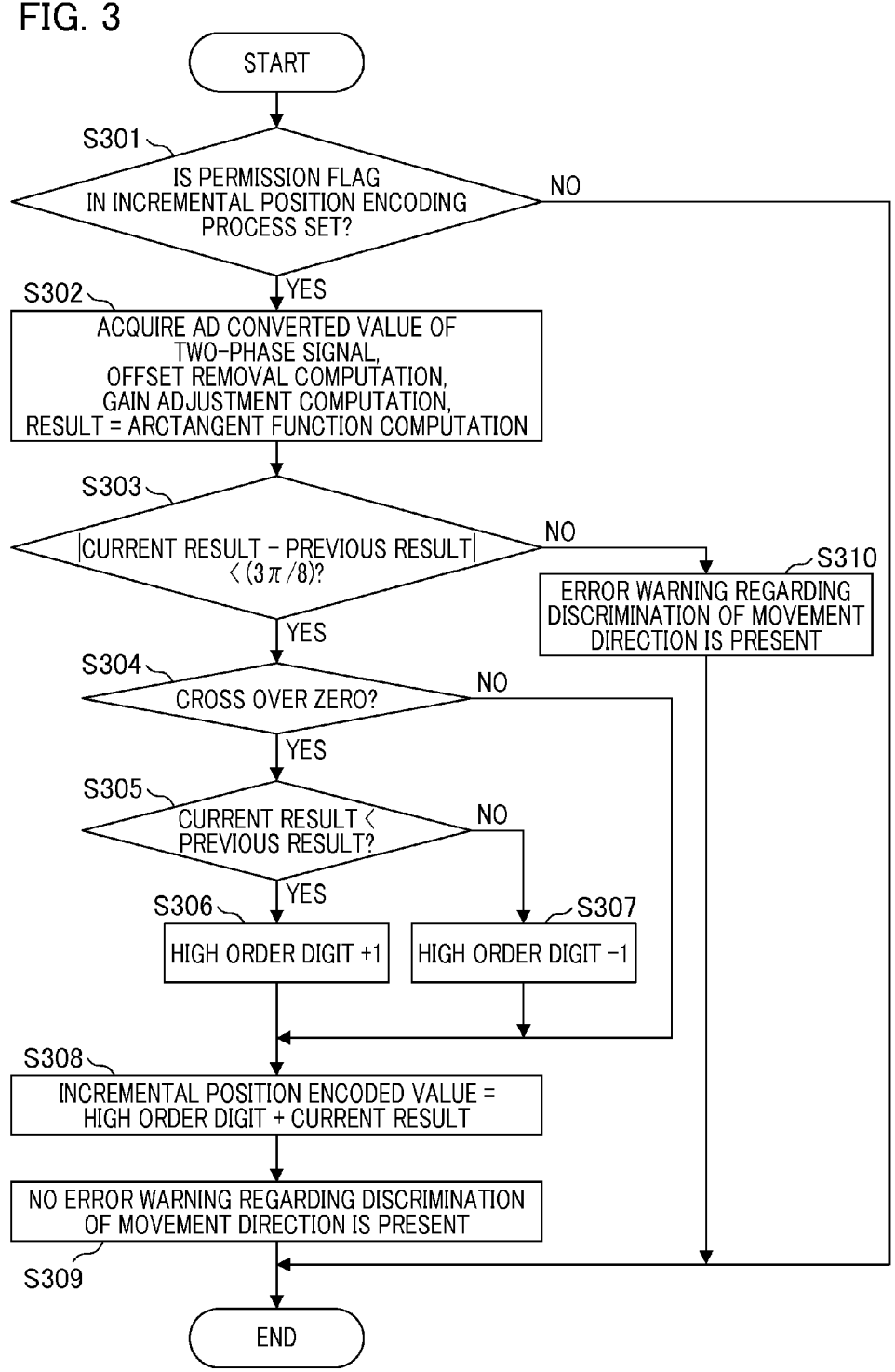

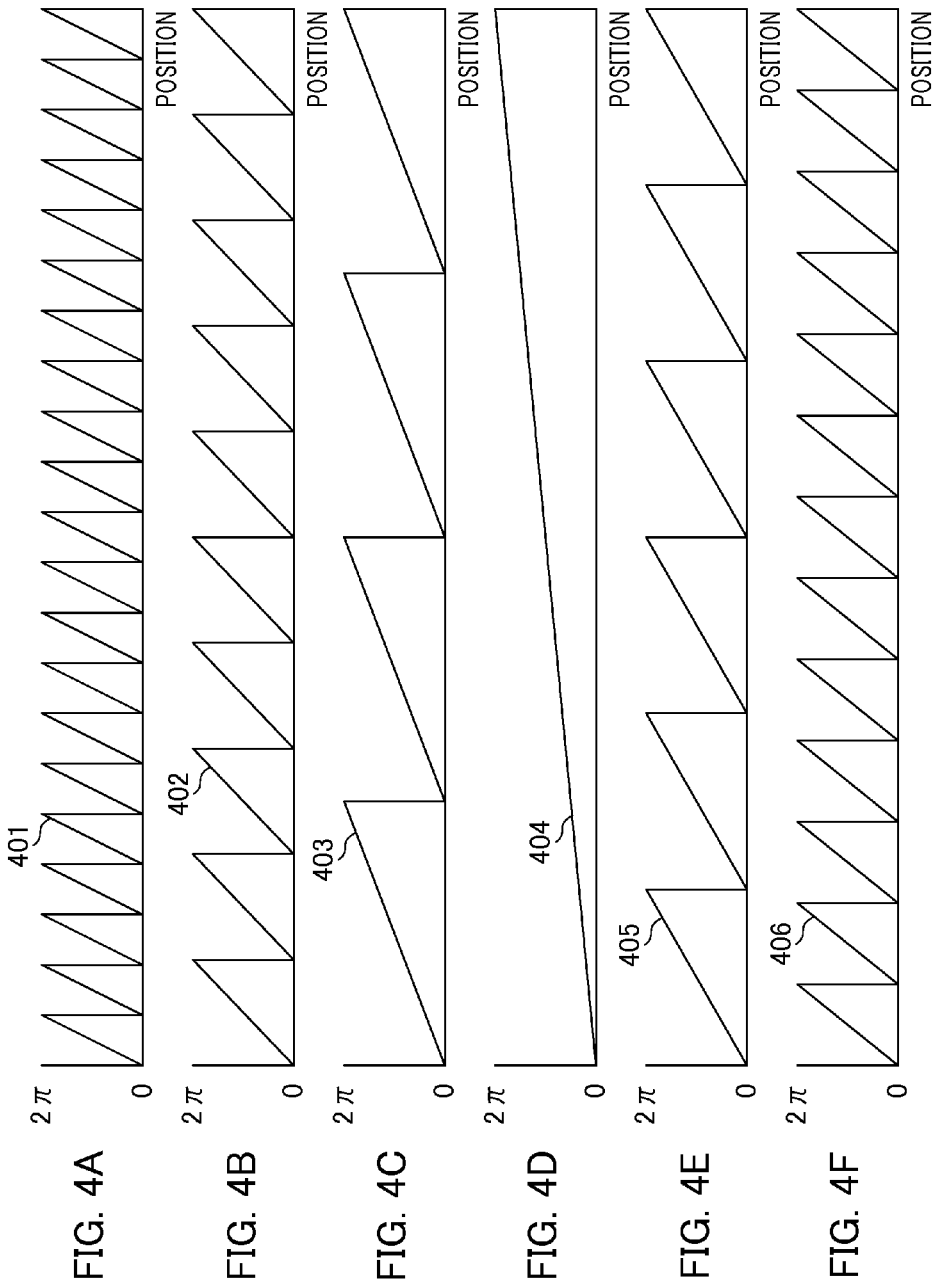

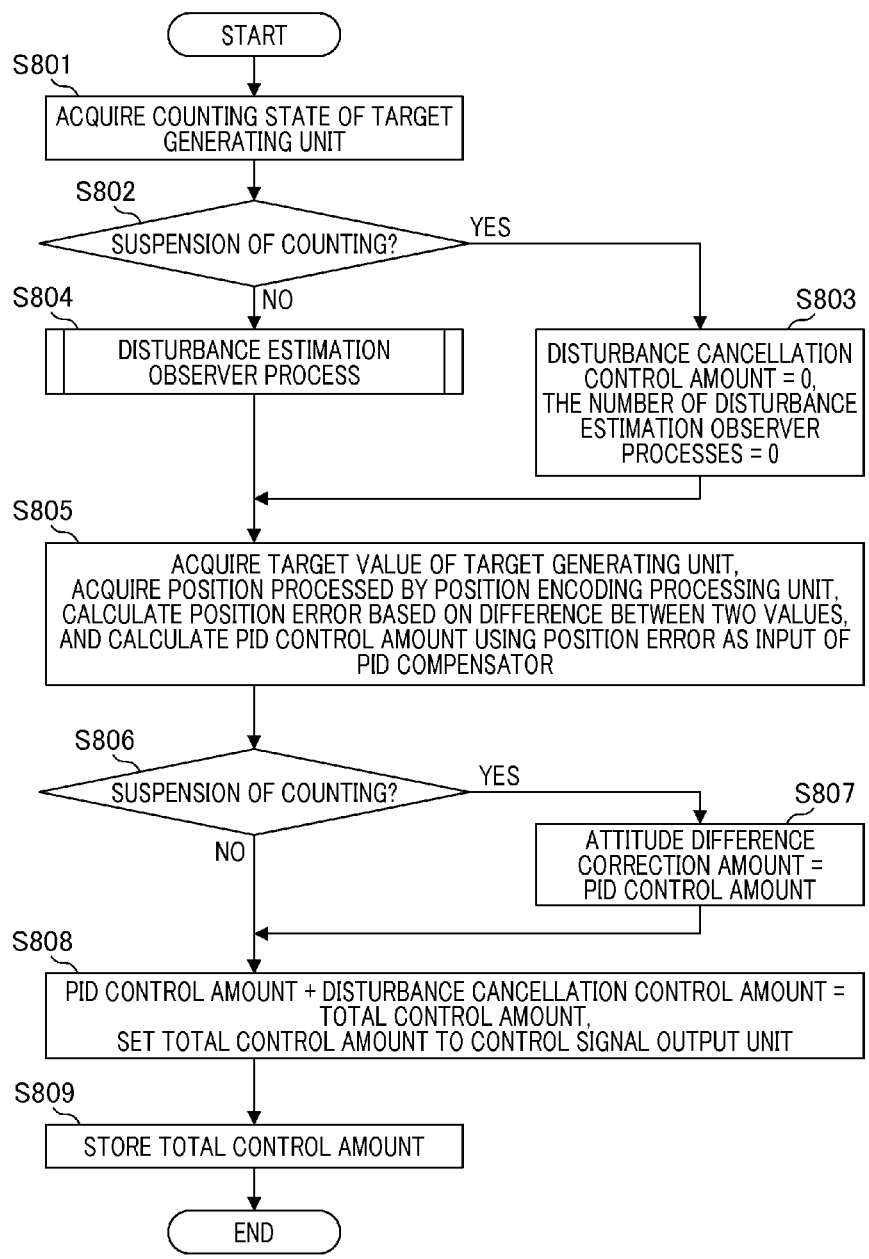

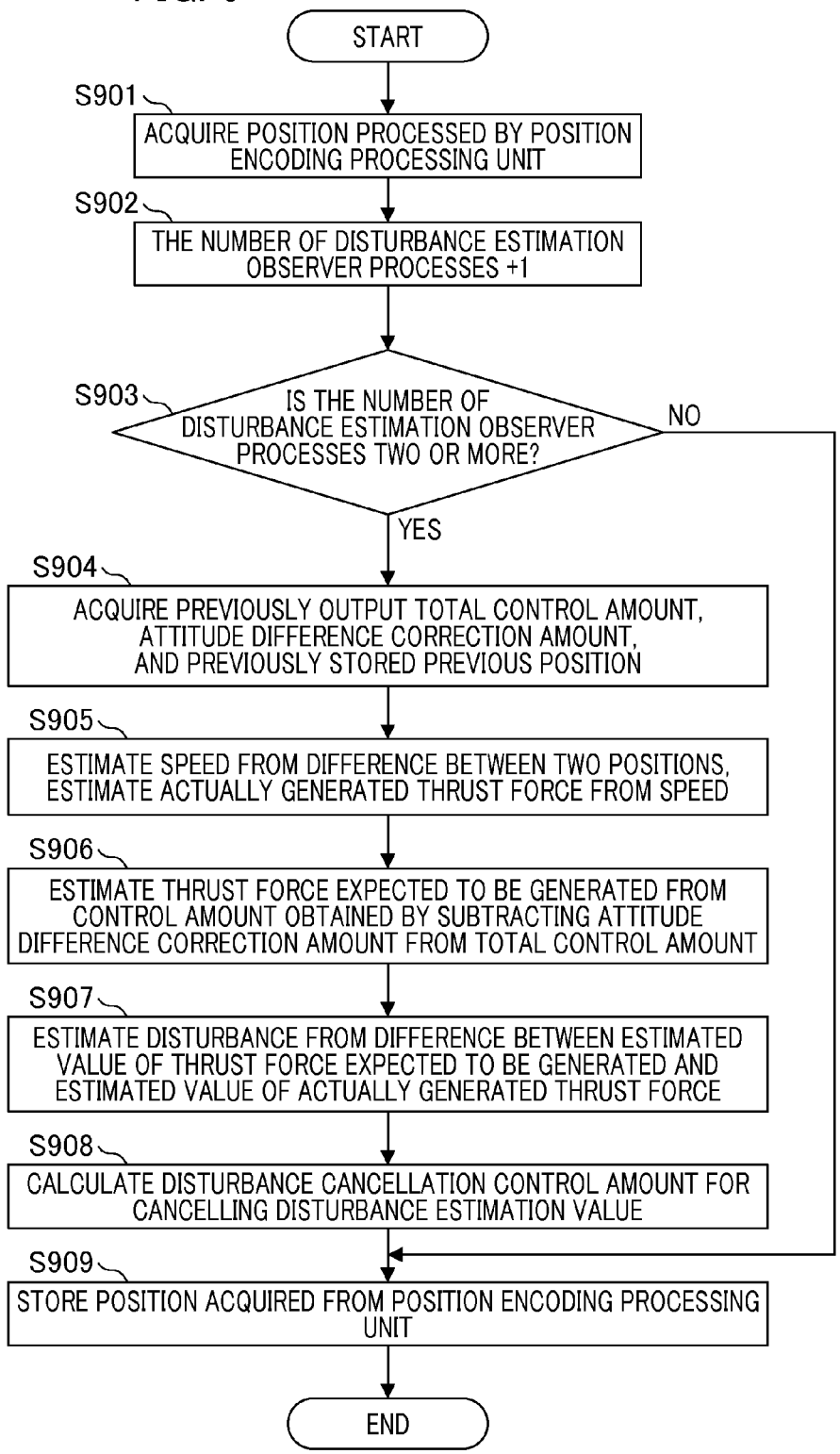

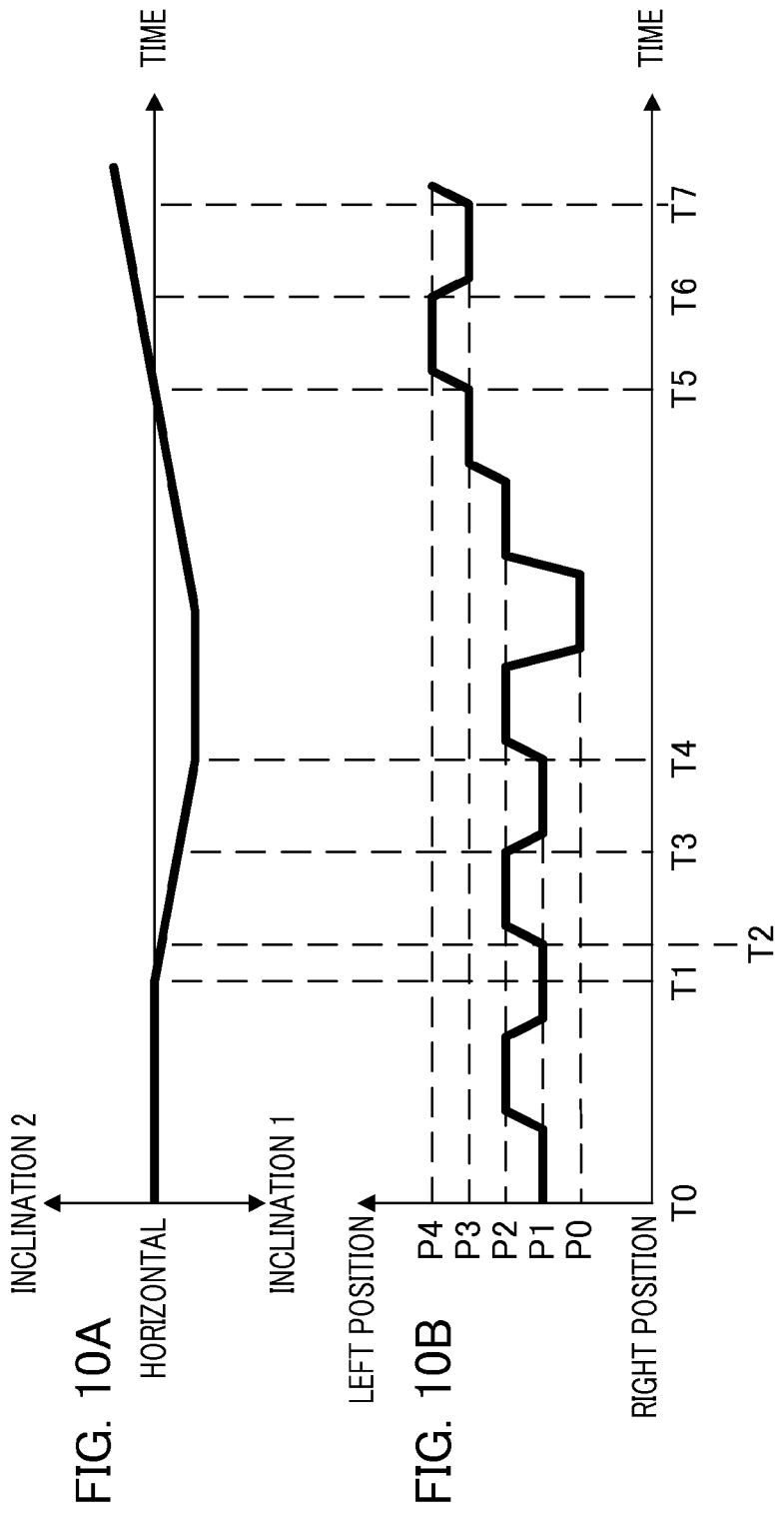

| | Attitude | Direction of travel | PID control amount | Attitude difference correction amount | Total control amount = Attitude difference correction amount |
|---|---|---|---|---|---|
| FIG. 11A. | Horizontal | Suspended | 0 | 0 | Disturbance estimation observer OFF |
| FIG. 11B. | Horizontal | ←Left | 10 | 0 | 10 − 0 + Disturbance cancellation control amount = 10 + Disturbance cancellation control amount |
| FIG. 11C. | Horizontal | →Right | −10 | 0 | −10 − 0 + Disturbance cancellation control amount = −10 + Disturbance cancellation control amount |
| FIG. 11D. | Inclination 1 | Suspended | −20 | −20 | Disturbance estimation observer OFF |
| FIG. 11E. | Inclination 1 | ↙ Lower−left | −10 | −20 | −10 − (−20) + Disturbance cancellation control amount = 10 + Disturbance cancellation control amount |
| FIG. 11F. | Inclination 1 | ↗ Upper−right | −35 | −25 | −35 − (−25) + Disturbance cancellation control amount = −10+Disturbance cancellation control amount |
| FIG. 11G. | Inclination 2 | Suspended | 20 | 20 | Disturbance estimation observer OFF |
| FIG. 11H. | Inclination 2 | ↖ Upper−left | 30 | 20 | 30 − 20 + Disturbance cancellation control amount = 10 + Disturbance cancellation control amount |
| FIG. 11I. | Inclination 2 | ↘ Lower−right | 15 | 25 | 15 − 25 + Disturbance cancellation control amount = −10 + Disturbance cancellation control amount |

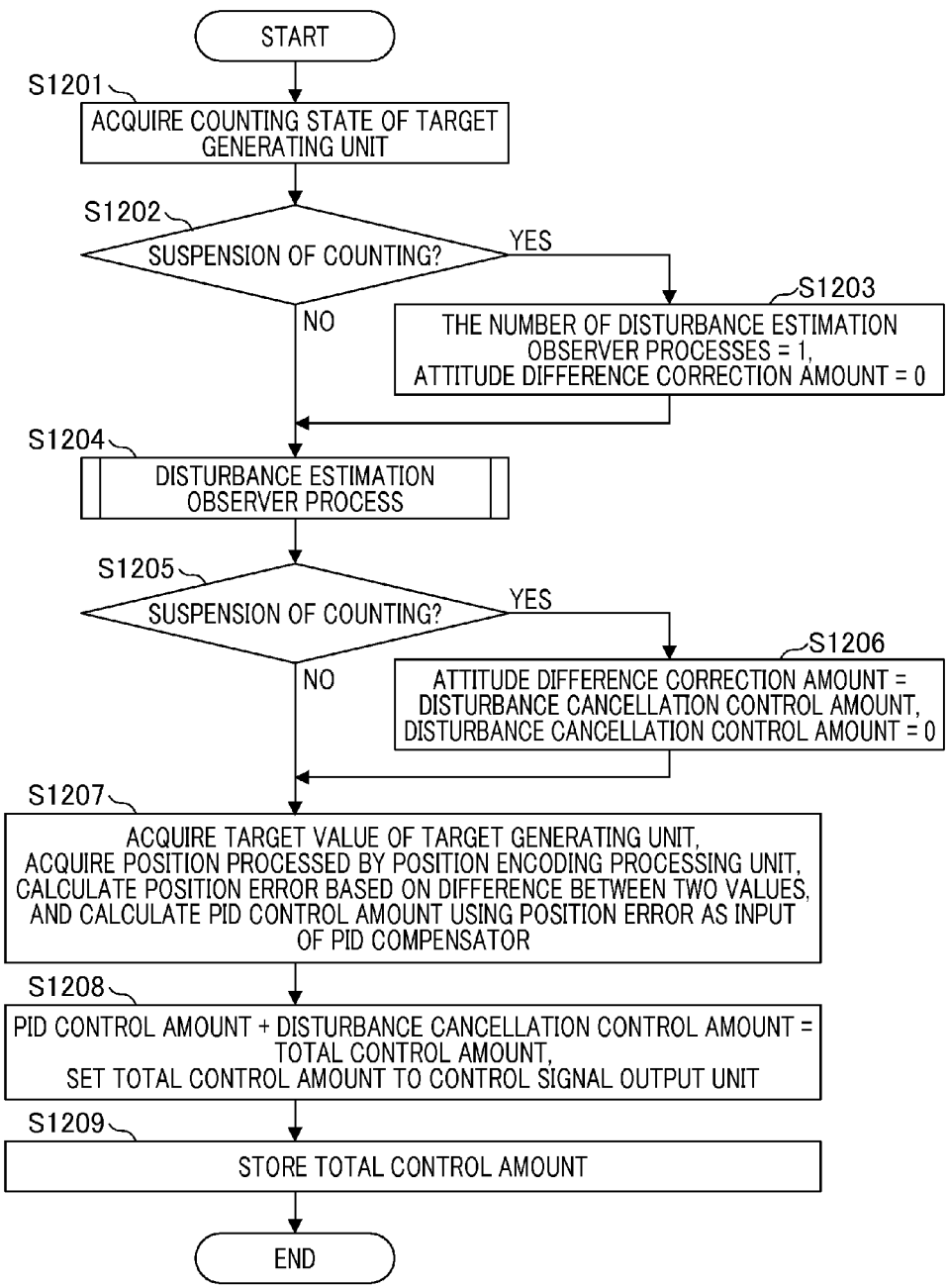

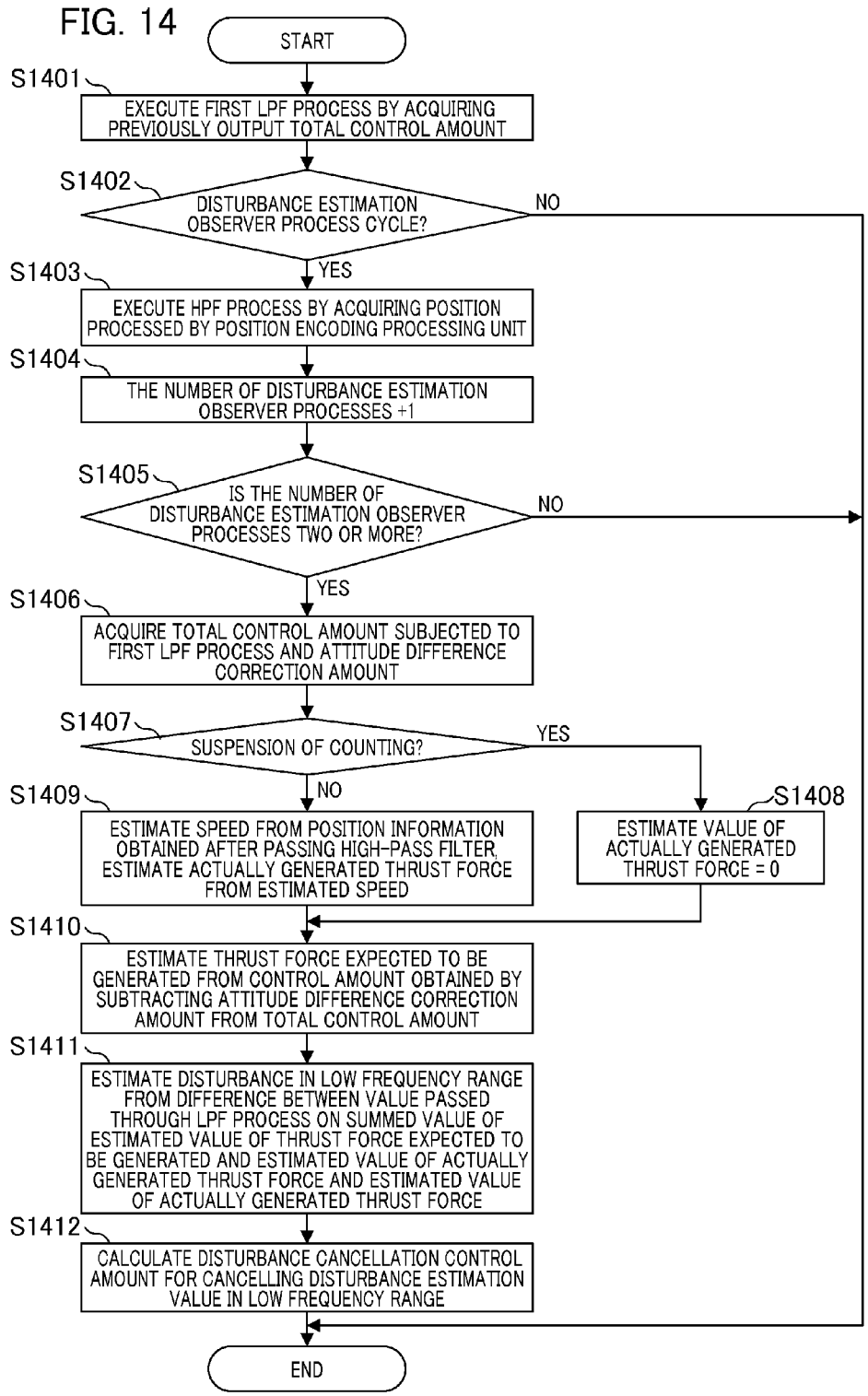

POSITION CONTROL APPARATUS, POSITION CONTROL METHOD, OPTICAL APPARATUS, AND IMAGING APPARATUS

BACKGROUND OF THE INVENTION

Field of the Invention

The present invention relates to an apparatus and a method for controlling the position of a control target using a disturbance estimation observer.

Description of the Related Art

There is a servo control system using an observer which servo-controls a control target and detects the absolute position of the control target to estimate a state amount such as position, speed, disturbance to be applied to the control target, or the like. Japanese Patent Laid-Open No. H4-238509 discloses a servo control system which is capable of directly and safely controlling a control target from any stopped position to a target position.

A control apparatus which is installed in a fixed coordinate system is assumed to be used in Japanese Patent Laid-Open No. H4-238509. If the installed attitude of the entire apparatus changes, a state amount is calculated based on a drive instruction applied to a drive unit but a drive instruction component for working against a change in attitude is biased, so that the result of the estimated state amount may be an erroneous estimated value.

SUMMARY OF THE INVENTION

The present invention provides a position control apparatus and a position control method which are capable of reducing the likelihood of erroneous estimation for the result of the estimated state amount even if the attitude of a control target changes.

According to an aspect of the present invention, a position control apparatus is provided that includes a calculating unit configured to calculate a control amount for causing a control target to follow a target position in response to the detected position of the control target; a control unit configured to control the control target in response to the control amount calculated by the calculating unit or a total control amount obtained by adding the control amount to a disturbance cancellation control amount corresponding to the amount of movement of the control target; and a storage unit configured to store an attitude difference correction amount which is a control amount for maintaining a stopped state if the control target is in the stopped state, wherein the disturbance cancellation control amount is furthermore a control amount which corresponds to a control amount obtained by computing the attitude difference correction amount stored in the storage unit from the total control amount during position control for causing the control target to follow a moving target.

Further features of the present invention will become apparent from the following description of exemplary embodiments with reference to the attached drawings.

BRIEF DESCRIPTION OF THE DRAWINGS

FIG. 3 is a flowchart illustrating an incremental position encoding process.

FIGS. 4A to 4F are conceptual diagrams illustrating an incremental signal and a combined signal.

FIG. 8 is a flowchart illustrating a process according to the first embodiment.

FIG. 9 is a flowchart illustrating a disturbance estimation observer process according to the first embodiment.

FIGS. 10A to 10B are diagrams illustrating an example of an operation target according to the first embodiment.

FIGS. 11A to 11I are diagrams illustrating an example of a numerical variation according to the first embodiment.

FIG. 12 is a flowchart illustrating a process according to a second embodiment of the present invention.

FIG. 14 is a flowchart illustrating a disturbance estimation observer process according to the second embodiment.

DESCRIPTION OF THE EMBODIMENTS

Hereinafter, preferred embodiments of the present invention will be described with reference to the drawings. The present invention is applicable to the drive control of optical components in an imaging apparatus such as not only a digital single lens reflex camera and a digital compact camera but also a digital video camera, a monitoring camera, a Web camera, a cellular phone, or the like. The present invention is also applicable to an optical apparatus such as an interchangeable lens for a digital single lens reflex camera. Thus, an optical apparatus or an imaging apparatus constitutes an aspect of the present invention. In the following embodiments, a voice coil type linear motor is illustrated as an actuator which exerts no retaining force upon the occurrence of no thrust force.

(First Embodiment)

In the first embodiment of the present invention, the output of a servo compensator during position control to a fixing position at a target speed of zero is stored as an attitude difference correction amount, and then the stored attitude difference correction amount is subtracted from the total control amount during position control for causing the control target to follow a moving target at a target speed of other than zero to perform disturbance estimation.

Figure 1:
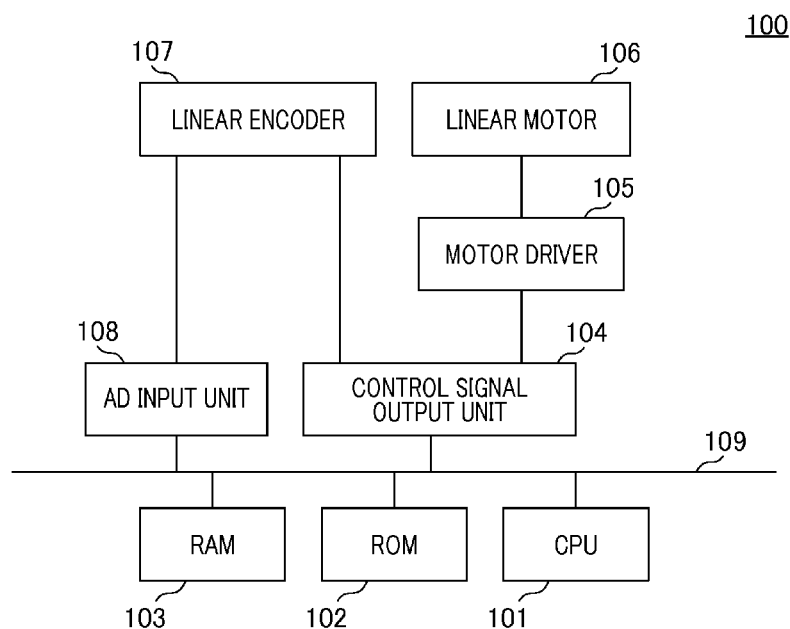
FIG. 1 is a block diagram illustrating a position control apparatus according to an embodiment of the present invention.

FIG. 1 illustrates an example of a configuration of a position control apparatus 100 which is common in embodiments of the present invention. A CPU (Central Processing Unit) 101, ROM (Read Only Memory) 102, RAM (Random Access Memory) 103, a control signal output unit 104, and an AD input unit 108 are connected to an internal bus 109. The respective units can transmit/receive data to/from each other via the internal bus 109. The ROM 102 is a Read Only Memory for storing various programs or the like running on the CPU 101. The CPU 101 which serves as a control unit and a measuring unit controls the respective units provided in the position control apparatus 100 using the RAM 103 as a work memory in accordance with the programs stored in the ROM 102 or the like.

The control signal output unit 104 outputs a control signal instructed by the CPU 101 to a motor driver 105 to drive a linear motor 106. The control signal output unit 104 also outputs a control signal instructed by the CPU 101 to a linear encoder 107 to cause it to output an incremental signal with different phases. The linear motor 106 moves a control target (not shown) such as a lens. The linear encoder 107 for position detection outputs an incremental signal in response to the movement of the control target. The AD input unit 108 analog-to-digital (A/D) converts an incremental signal output from the linear encoder 107, and outputs the A-D converted signal to the CPU 101. The CPU 101 calculates a current position from the incremental signal converted by the AD input unit 108 by an incremental position encoding process (hereinafter referred to as "first encoding process") and an absolute position encoding process (hereinafter referred to as "second encoding process").

Figure 2A:
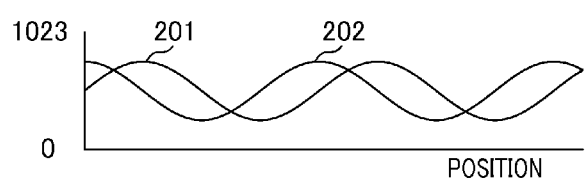
FIGS. 2A to 2C are conceptual diagrams illustrating an incremental signal process.
Figure 2B:
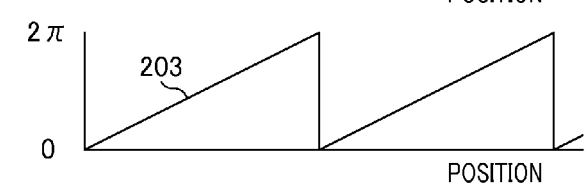
Figure 2C:
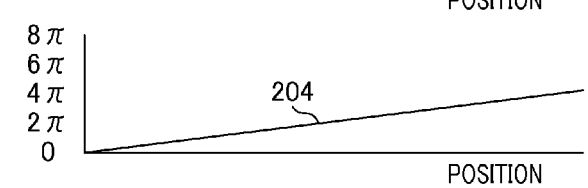

A description will be given of the first encoding process with reference to FIGS. 2A to 3. FIGS. 2A to 2C are conceptual diagrams illustrating an incremental signal process. FIG. 3 is a flowchart illustrating the first encoding process executed by the CPU 101.

FIG. 2A illustrates a waveform of an incremental signal, where the vertical axis represents the 10-bit AD converted value and the horizontal axis represents a position. A sine wave 201 and a cosine wave 202 are output in response to the movement of the control target. FIG. 2B shows the inverse function of the tangent function (arctangent function) by the sine wave 201 and the cosine wave 202, where the vertical axis represents an angle in radian measure and the horizontal axis represents a position. An arctangent function value 203 is computed after normalization in the range from 0 to 2π. FIG. 2C shows an incremental position encoded value, where the vertical axis represents a monotonically increasing incremental position encoded value 204 and the horizontal axis represents a position. If the arctangent function value 203 crosses over zero, the high order digit corresponding to 2π in MSB (Most Significant Bit) increases or decreases. For example, if the arctangent function value 203 increases from zero, crosses over zero again, and then further increases, 2π is added to the incremental position encoded value 204. On the other hand, if the arctangent function value 203 decreases to zero, 2π is subtracted from the incremental position encoded value 204.

A description will be given of the first encoding process with reference to FIG. 3. In step S301, the CPU 101 determines whether or not a permission flag in the first encoding process is in a set state. If the permission flag is not in a set state, the process ends, whereas if the permission flag is in a set state, the process proceeds to step S302. In step S302, the CPU 101 acquires the AD converted value of the two-phase signal to perform offset removal computation and gain adjustment computation. The two-phase signal is a pair of signals having different phases, such as the sine wave 201 and the cosine wave 202 shown in FIG. 2A. The CPU 101 stores data of the computation result of the arctangent function (the arctangent function value 203) shown in FIG. 2B in the RAM 103.

In step S303, the CPU 101 compares the absolute value of a difference between the previous arctangent function computation result and the current arctangent function computation result with 3π/8. It is determined whether or not the absolute value of the difference is less than 3π/8. If the absolute value of the difference is less than 3π/8, the process proceeds to step S304, whereas if the absolute value of the difference is equal to or greater than 3π/8, the process shifts to step S310. In step S304, the CPU 101 determines whether or not the position of the control target crosses over zero due to its movement as a result of the previous arctangent function computation result and the current arctangent function computation result. If the position of the control target crosses over zero, the process shifts to step S305, whereas if the position of the control target does not cross over zero, the process shifts to step S308. In step S305, the CPU 101 determines whether or not the current arctangent function computation result is less than the previous arctangent function computation result. If the current arctangent function computation result is less than the previous arctangent function computation result, the process shifts to step S306, whereas if the current arctangent function computation result is equal to or greater than the previous arctangent function computation result, the process shifts to step S307. In step S306, the CPU 101 adds 1 to the high order digit in 2π unit. The high order digit is a digit greater than 2π of the incremental position encoded value. On the other hand, in step S307, the CPU 101 subtracts 1 from the high order digit.

After step S306 or step S307, the process proceeds to step S308, and the CPU 101 sums the high order digit in 2π unit and the current arctangent function computation result. In this manner, the incremental position encoded value 204 shown in FIG. 2C is updated, and the process shifts to step S309. In step S309, the CPU 101 ends the process based on the fact that there is no error warning regarding discrimination of the movement direction. If the process shifts from step S303 to step S310, the CPU 101 ends the process based on the fact that there is an error warning regarding discrimination of the movement direction. The reason for this is because, since the absolute value of the difference between the current and the previous arctangent function computation results is equal to or greater than 3π/8, it is hard to discriminate whether the absolute value of the difference is equal to or greater than 3π/8 due to an increase or due to a decrease regarding the direction movement of the control target.

As described above, an encoded value is generated from an incremental signal, so that the encoded value may be used for position control.

Figure 5:
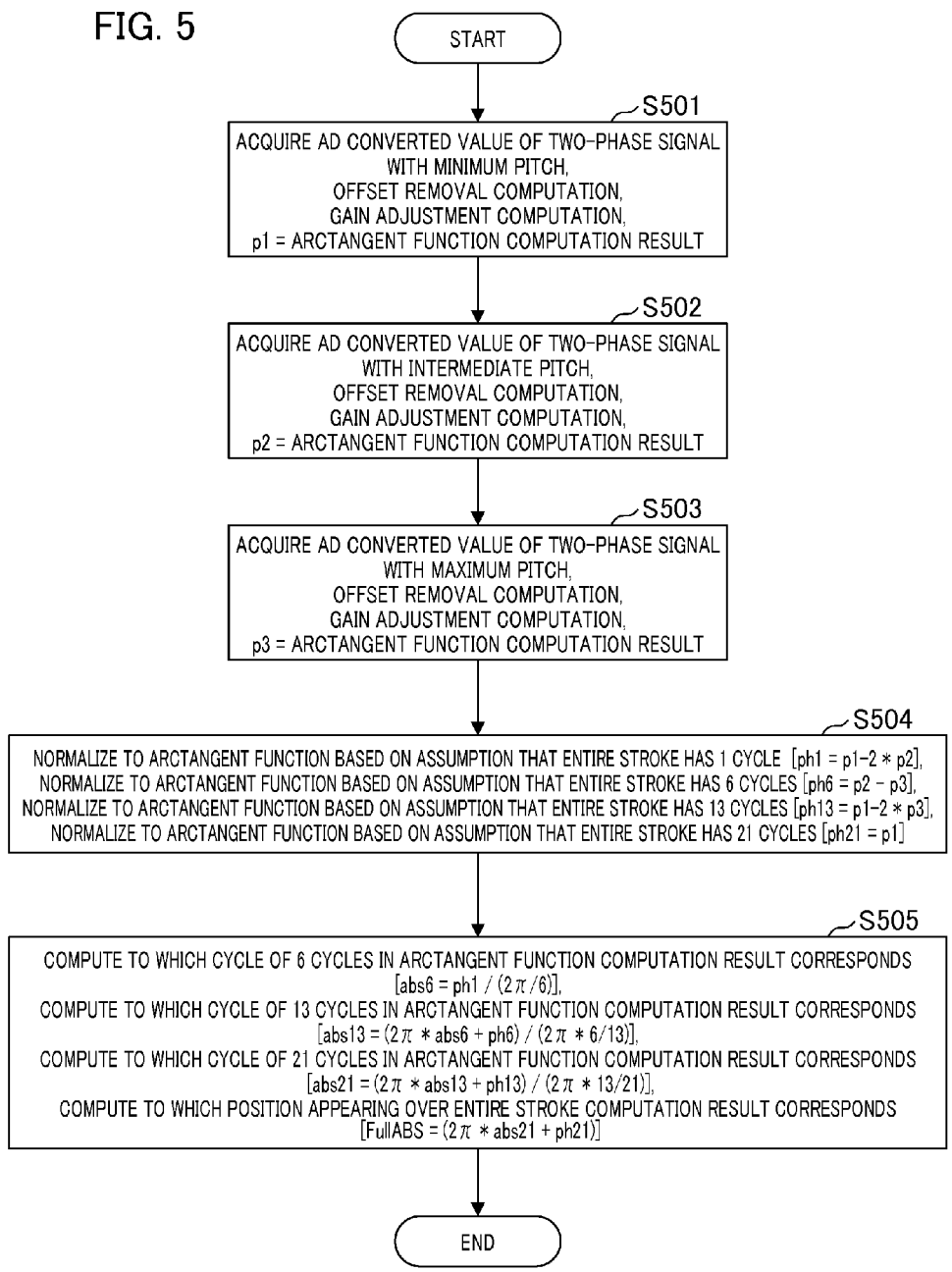
FIG. 5 is a flowchart illustrating an absolute position encoding process.

Next, a description will be given of the second encoding process with reference to FIGS. 4A to 5. FIGS. 4A to 4F are conceptual diagrams illustrating three types of incremental signals having different pitches and their combined signals. In FIGS. 4A to 4F, the vertical axis represents an angle in radian and the horizontal axis represents a position. The arctangent function value plotted on the vertical axis is computed after normalization in the range from 0 to 2π as the arctangent function in response to the movement of the control target. FIG. 5 is a flowchart illustrating the second encoding process executed by the CPU 101.

FIG. 4A shows an arctangent function computation result 401 with the minimum pitch, where 21 cycles appear over the entire stroke. FIG. 4B shows an arctangent function computation result 402 with intermediate pitch, where 10 cycles appear over the entire stroke. FIG. 4C shows an arctangent function computation result 403 with maximum pitch, where 4 cycles appear over the entire stroke. FIGS. 4D to 4F will be described below.

In step S501 shown in FIG. 5, the CPU 101 acquires the AD converted value of the two-phase signal with the minimum pitch, which is stored in the RAM 103, to perform offset removal computation and gain adjustment computation. Then, the CPU 101 stores the arctangent function computation result 401 shown in FIG. 4A as "p1" in the RAM 103. In the next step S502, the CPU 101 acquires the AD converted value of the two-phase signal with intermediate pitch, which is stored in the RAM 103, to perform offset removal computation and gain adjustment computation. The CPU 101 stores the arctangent function computation result 402 shown in FIG. 4B as "p2" in the RAM 103. In the next step S503, the CPU 101 acquires the AD converted value of the two-phase signal with maximum pitch, which is stored in the RAM 103, to perform offset removal computation and gain adjustment computation. The CPU 101 stores the arctangent function computation result 403 shown in FIG. 4C as "p3" in the RAM 103, and the process shifts to step S504.

In step S504, the CPU 101 performs processing of normalization to the arctangent function using the following formula based on the assumption that the entire stroke has N cycles where N is an integer variable. A specific description will be given of the case where N=1, 6, 13, or 21.

$$ph1 = p1 - 2*p2 \quad \text{(Formula 1)}$$

$$ph6 = p2 - p3 \quad \text{(Formula 2)}$$

$$ph13 = p1 - 2*p3 \quad \text{(Formula 3)}$$

Note that Formula (1) is used if N=1, Formula (2) is used if N=6, and Formula (3) is used if N=13.

If N=1, the CPU 101 calculates phi using data of p1 and p2 stored in the RAM 103 by Formula (1), and stores the data of the calculation result in the RAM 103. The computation result 404 shown in FIG. 4D illustrates phi which is computed after normalization in the range from 0 to $2\pi$ as a result of Formula (1) in response to the movement of a control target, where 1 cycle appears over the entire stroke. If N=6, the CPU 101 calculates ph6 using data of p2 and p3 stored in the RAM 103 by Formula (2), and stores the data of the calculation result in the RAM 103. The computation result 405 shown in FIG. 4E illustrates ph6 which is computed after normalization in the range from 0 to $2\pi$ as a result of Formula (2) in response to the movement of the control target, where 6 cycles appear over the entire stroke. If N=13, the CPU 101 calculates ph13 using data of p1 and p3 stored in the RAM 103 by Formula (3), and stores the data of the calculation result in the RAM 103. The computation result 406 shown in FIG. 4F illustrates ph13 which is computed after normalization in the range from 0 to $2\pi$ as a result of Formula (3) in response to the movement of the control target, where 13 cycles appear over the entire stroke. If N=21, the CPU 101 stores data in the RAM 103 by taking p1 stored in the RAM 103 as ph21 (ph21=p1). As shown in FIG. 4A, 21 cycles appear over the entire stroke of ph21.

In the next step S505, the CPU 101 calculates to which cycle of N cycles the computation result corresponds using the following formula.

$$abs6 = ph1 \bigg/ \left(\frac{2\pi}{6}\right) \quad \text{(Formula 4)}$$

$$abs13 = (2\pi * abs6 + ph6) \bigg/ \left(2\pi * \frac{6}{13}\right) \quad \text{(Formula 5)}$$

$$abs21 = (2\pi * abs13 + ph13) \bigg/ \left(2\pi * \frac{13}{21}\right) \quad \text{(Formula 6)}$$

$$FullABS = (2\pi * abs21 + ph21) \quad \text{(Formula 7)}$$

The CPU 101 computes to which cycle of 6 cycles appearing over the entire stroke the computation result corresponds using phi stored in the RAM 103 by Formula (4), and then stores the data of abs6 in the RAM 103. The CPU 101 computes to which cycle of 13 cycles appearing over the entire stroke the computation result corresponds using data of abs6 and ph6 by Formula (5), and then stores the data of abs13 in the RAM 103. The CPU 101 computes to which cycle of 21 cycles appearing over the entire stroke the computation result corresponds using data of abs13 and ph13 by Formula (6), and then stores the data of abs21 in the RAM 103. The CPU 101 computes to which position appearing over the entire stroke the computation result corresponds at a resolution with the minimum pitch using the data of abs21 and ph21 by Formula (7), and stores data of FullABS in the RAM 103 to end the process.

As described above, an incremental signal having a different pitch may further be generated by combining three incremental signals having different pitches from each other. A plurality of incremental signals having different pitches, which are acquired when the control target is in a stationary state, is combined to perform second encoding process, so that the absolute position can be calculated at a resolution with the minimum pitch. Then, even if the first encoding process is continuously executed by fixing a resolution with the minimum pitch, the generated incremental position encoded value may be treated as the absolute position encoded value.

Figure 6:
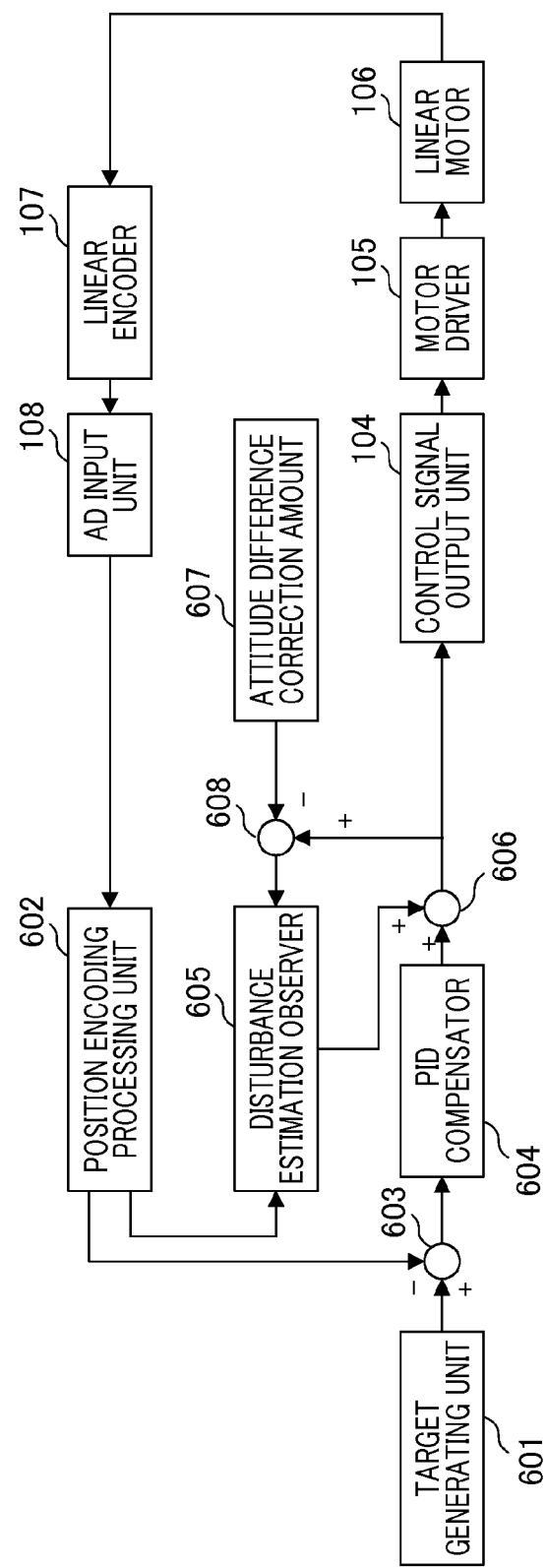
FIG. 6 is a block diagram illustrating a control system according to a first embodiment of the present invention.

Next, a description will be given of a configuration of a control system with reference to FIG. 6. FIG. 6 is a block diagram illustrating a control system according to the present embodiment. The components corresponding to or similar to those in FIG. 1 are designated by the same reference numerals, and explanation thereof will be omitted. A description will be given based on the assumption that the adding unit includes the addition process and the subtraction process (addition of a negative value).

The control signal output unit 104 outputs a PWM (Pulse Width Modulation) signal, which has been converted into a duty ratio using the control amount designated by the CPU 101 as input, as a control signal to the motor driver 105. The motor driver 105 is, for example, an H-bridge driver that drives the linear motor 106 in the forward and backward directions in response to the duty ratio of the PWM signal input as the control signal. The linear motor 106 is, for example, a voice coil motor that stops with no thrust force if the duty ratio in the horizontal attitude is 50%. If the duty ratio is 100%, the linear motor 106 generates the maximum thrust force in the forward direction, whereas if the duty ratio is 0%, the linear motor 106 generates the maximum thrust force in the backward direction. Since the voice coil motor has no retaining force in the absence of a thrust force, the voice coil motor moves in the direction of gravity if the attitude thereof is tilted. Thus, if a change in attitude occurs in a direction other than the horizontal attitude, position control for outputting a control amount for continuously generating a thrust force is performed for the purpose of preventing the voice coil motor from being displaced by gravity despite the stopped state thereof.

The linear encoder 107 converts the amount of movement of the linear motor 106 used as input into a sine wave signal and a cosine wave signal (see FIG. 2A) to output these signals. The AD input unit 108 AD-converts the sine wave signal and the cosine wave signal output from the linear encoder 107. The AD converted value is output to a position encoding processing unit 602. The position encoding processing unit 602 performs conversion into a distance in response to a change of the AD converted value into a sine wave shape. The converted signal is output to an adding unit 603 and a disturbance estimation observer 605.

A target generating unit 601 generates a target value signal for the linear motor 106, and outputs it to the adding unit 603. The target value includes a target speed to be followed by the linear motor 106 and information about the target position. The adding unit 603 calculates and outputs a difference between the target value output from the target generating unit 601 as a positive input and the current position output from the position encoding processing unit 602 as a negative input. The difference is the position error of servo-control. A PID compensator 604 generates a PID control amount by using the position error output from the adding unit 603 as input and outputs the PID control amount to the adding unit 606. The proportional-integration-differentiation (PID) control is known, and the detailed description thereof will be omitted. The adding unit 606 adds the output of the disturbance estimation observer 605 to the output of the PID compensator 604, and outputs the addition result to an adding unit 608 and the control signal output unit 104.

Upon disturbance estimation by the disturbance estimation observer 605, a storage unit 607 for storing an attitude difference correction amount stores a correction amount (attitude difference correction amount) for subtracting a control amount for working against a change in attitude from the total control amount. The attitude difference correction amount is output as a negative input to the adding unit 608. The adding unit 608 subtracts the attitude difference correction amount from the total control amount by using the total control amount which is the output of the adding unit 606 as a positive input. The subtraction result is output to the disturbance estimation observer 605.

The disturbance estimation observer 605 performs disturbance estimation based on a difference between the control amount applied to the linear motor 106 and the actual moving speed of the control target by using the output of the adding unit 608 and the output of the position encoding processing unit 602 as inputs. The disturbance estimation observer 605 generates the disturbance cancellation control amount in response to the estimated disturbance and outputs it to the adding unit 606. The details of the disturbance estimation observer 605 will be described below with reference to FIGS. 7 and 9. The adding unit 606 sums the PID control amount which is the output of the PID compensator 604 and the disturbance cancellation control amount which is the output of the disturbance estimation observer 605. A sum of these amounts is output as the total control amount to the control signal output unit 104.

As described above, a servo control system is configured for causing the position of the linear motor 106 to follow a target value. Note that a description will be given below of a method for determining the attitude difference correction amount to be stored in the attitude difference correction amount storage unit 607.

Figure 7:
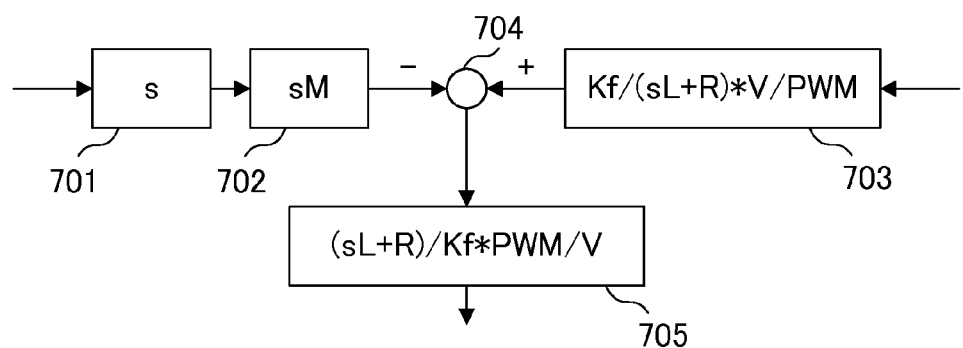
FIG. 7 is a block diagram illustrating a disturbance estimation observer according to the first embodiment.

Next, a detailed description will be given of the disturbance estimation observer 605 with reference to the block diagram shown in FIG. 7. In FIG. 7, the symbol "s" represents a Laplace variable. A block 701 differentiates position information which is the output of the position encoding processing unit 602 and converts it into speed information. A block 702 converts speed information which is the output of the block 701 into actually generated thrust force information indicating the actual output of the linear motor 106 using the equation of motion of the acceleration information obtained by differentiating the speed information which is the output of the block 701 and mass information M. Since the actually generated thrust force information is determined from the amount of movement between control samples, i.e., the speed therebetween, the actually generated thrust force information becomes zero in principle during position control to a fixing position at the target speed of zero. A block 703 converts the control amount which is the output of the adding unit 608 into the generated thrust force information which is derived in design from the model of the linear motor 106. The model of the linear motor 106 has the number of bit resolutions of PWM, a motor power supply voltage V, a resistance value R, a reactance value L, and a thrust force conversion constant Kf, where the resistance value R and the reactance value L are included as a factor of "1/(sL+R)". Since the generated thrust force information is derived from the control amount applied to the linear motor 106, conversion is performed based on the assumption that the corresponding thrust force occurs when a control amount for working against gravity is applied during position control to a fixing position at the target speed of zero in principle.

An adding unit 704 converts a difference between the actually generated thrust force information and the generated thrust force information derived from the model of the linear motor 106 in design into the disturbance estimation result as the lost disturbance thrust force. The difference is a disturbance thrust force. Thus, if the total control amount is used without considering the attitude difference in the disturbance estimation during position control for causing the control target in a tilted state to follow a moving target, all of the control amount for working against gravity without contributing to the occurrence of speed may be treated as a disturbance thrust force. Hence, in the present embodiment, the adding unit 608 performs the process for subtracting the control amount, which is applied to the linear motor 106, for working against gravity due to a change in attitude as the attitude difference correction amount from the total control amount so as not to use the control amount for disturbance estimation.

A block 705 converts the disturbance estimation result which is the output of the adding unit 704 into a disturbance cancellation control amount for generating a thrust force corresponding to the disturbance estimation result using an inverse model of the linear motor 106. The inverse model of the linear motor 106 has the number of bit resolutions of PWM, a motor power supply voltage V, and a thrust force conversion constant Kf as the reciprocal of the model of the linear motor 106 shown in the block 703, where the resistance value R and the reactance value L are included as a factor of "1/(sL+R)".

As described above, the disturbance estimation observer 605 that estimates disturbance from the control amount applied to the linear motor 106 and the amount of movement of the control target so as to output a disturbance cancellation control amount for cancelling the disturbance as the lost thrust force is configured. The adding unit 606 sums the PID control amount and the disturbance cancellation control amount to output the resulting amount to the control signal output unit 104, so that disturbance such as a difference in independent properties of linear motor control systems, a time lapse change, or the like, which is beyond compensation only by the control of the PID compensator 604, can be cancelled. In the present embodiment, PID control is performed, and the control amount working against gravity is accumulated and output as an I-control component even during position control to a fixing position at the target speed of zero. Note that the controller is not particularly limited to a PID control servo compensator as long as it can be combined with a disturbance estimation observer.

Next, a description will be given of the process for determining an attitude difference correction amount which can reduce the likelihood of erroneous estimation for the result of the estimated state amount even if the attitude of the control target changes with reference to FIGS. 6 to 11I. FIG. 8 is a flowchart illustrating the position control process executed by the CPU 101 in the block diagram shown in FIG. 6. FIG. 9 is a flowchart illustrating the details of the disturbance estimation observer process in step S804 shown in FIG. 8.

In step S801 shown in FIG. 8, the CPU 101 acquires information about the counting state indicating as to whether the target generating unit 601 is in the increase/decrease in counting of a target value or in the suspension of counting of a target value. In step S802, the CPU 101 determines whether or not the target generating unit 601 is in the suspension of counting. If the target generating unit 601 is in the suspension of counting, the process proceeds to step S803, whereas if the target generating unit 601 is in the increase/decrease in counting, the process shifts to step S804. The increase/decrease in counting indicates position control for causing a control target to follow a moving target at a target speed of other than zero. The suspension of counting indicates position control for keeping a control target idle at a fixing position at a target speed of zero.

In step S803, the CPU 101 sets the disturbance cancellation control amount to 0 and the number of disturbance estimation observer processes (hereinafter simply referred to as "the number of processes") to 0. In principle, disturbance estimation cannot be made due to the fact that the actually generated thrust force information becomes 0 during position control to a fixing position at a target speed of zero, and thus, the disturbance estimation observer 605 is substantially in the OFF state by setting the disturbance cancellation control amount to 0. On the other hand, in step S804, the CPU 101 causes the disturbance estimation observer 605 to execute the disturbance estimation observer process. The details of the disturbance estimation observer process will be described below with reference to FIG. 9.

After step S803 or step S804, the process proceeds to step S805, and the CPU 101 acquires the target value of the target generating unit 601 and the current position processed by the position encoding processing unit 602, and then, the adding unit 603 calculates a position error based on a difference between the target value and the current position. The PID compensator 604 calculates a PID control amount using the position error as input. In step S806, the CPU 101 determines whether or not the target generating unit 601 is in the suspension of counting. If the target generating unit 601 is in the suspension of counting, the process proceeds to step S807, whereas if the target generating unit 601 is in the increase/decrease in counting, the process shifts to step S808. In step S807, the CPU 101 sets the current PID control amount determined in step S805 as the attitude difference correction amount for the next disturbance estimation observer process. During the suspension of counting, the PID control amount becomes 0 and the duty ratio becomes 50% if the attitude of the control target is horizontal. If there is a change in attitude, the PID control amount becomes non-zero such that the duty ratio becomes other than 50% so as to maintain the position for working against the change in attitude. The control amount required only for working against gravity without contributing to the occurrence of speed due to the stop of the control target is stored as the attitude difference correction amount in the storage unit 607.

FIGS. 10A to 10B are timing charts illustrating examples of operation targets for position control. In FIG. 10A, the horizontal axis represents a time axis, the vertical axis represents the attitude of the control target, and the center of the vertical axis represents horizontal. In FIG. 10B, the horizontal axis represents a time axis (see from time T0 to T7) and the vertical axis represents a target position (see from P0 to P4). FIGS. 11A to 11I are diagrams illustrating examples of numerical variation in operation. FIGS. 11A to 11I illustrate nine patterns having different attitudes and different directions of travel.

In FIG. 10A, the attitude of the control target is horizontal in the period from time T0 to T1. If the PID control amount in a stopped state is 0 as shown in FIG. 11A when the control target follows the stop target value at the position P1 or P2 in FIG. 10B during the period, the attitude difference correction amount is 0. In other words, the disturbance estimation observer 605 is in the OFF state. Then, assume the case where a change in attitude occurs in the orientation of an inclination 1 during the period from time T1 to T4. In this case, if the PID control amount in a stopped state is "−20" as shown in FIG. 11D at time T2 at which the control target follows the stop target value at the position P1 in FIG. 10B, the attitude difference correction amount is stored as "−20" in the storage unit 607. Furthermore, if the PID control amount in a stopped state is "−25" at time T3 at which the attitude of the control target is in the orientation of the inclination 1 and the control target follows the stop target value at the position P2 in FIG. 10B, the attitude difference correction amount is stored as "−25" in the storage unit 607.

Then, assume the case where a change in attitude occurs in the orientation of an inclination 2 opposite to the inclination 1 from time T5 shown in FIG. 10A. In this case, the PID control amount in a stopped state is "20" as shown in FIG. 11G at time T6 at which the control target follows the stop target value at the position P4 in FIG. 10B, the attitude difference correction amount is stored as "20" in the storage unit 607. Furthermore, if the PID control amount in a stopped state is "25" at time T7 at which the attitude of the control target is in the orientation of the inclination 2 and the control target follows the stop target value at the position P3 in FIG. 10B, the attitude difference correction amount is stored as "25" in the storage unit 607.

If the target generating unit 601 is not in the suspension of counting in step S806 shown in FIG. 8 or after step S807, the process proceeds to step S808, and the adding unit 606 sums the PID control amount and the disturbance cancellation control amount to calculate the total control amount. The total control amount is output from the adding unit 606 to the control signal output unit 104. In the next step S809, the CPU 101 stores the total control amount for the next disturbance estimation observer process in the RAM 103 to end the process.

As described above, even if a change in attitude of the control target occurs, the PID control amount in the latest suspension of counting is stored as the attitude difference correction amount in the storage unit 607.

Next, a description will be given of the disturbance estimation observer process in step S804 shown in FIG. 8 with reference to the flowchart shown in FIG. 9. In step S901, the CPU 101 acquires the current position processed by the position encoding processing unit 602. In step S902, the CPU 101 adds 1 to the number of processes and the process proceeds to step S903. In step S903, it is determined whether or not the number of processes is two or more. If the CPU 101 determines that the number of processes is two or more, the process proceeds to step S904, whereas if the CPU 101 determines that the number of processes is less than two, the amount of movement of the control target cannot be measured, and thus, the process shifts to step S909.

In step S904, the CPU 101 acquires the previously output total control amount, the current attitude difference correction amount, and the previously stored position (previous position) which are stored in the RAM 103. The previously output total control amount is the total control amount indicated by data stored in the RAM 103 in step S809 shown in FIG. 8. The previous position is the position indicated by data stored in the RAM 103 in step S909 to be described below. In step S905, the CPU 101 estimates the speed of the control target from a difference between the current position and the previous position, i.e., the amount of movement of the control target. This corresponds to conversion by the block 701 in FIG. 7. An actually generated thrust force which is estimated as to be actually generated is calculated based on the estimated speed and an inverse model of the linear motor 106. This corresponds to conversion by the block 702 in FIG. 7.

In the next step S906, the adding unit 608 subtracts the attitude difference correction amount (value stored in the storage unit 607) from the total control amount output by the adding unit 606. A thrust force which is expected to be generated if the control amount is applied (hereinafter referred to as "thrust force expected to be generated") is estimated from the control amount which is the subtraction result and the model of the linear motor 106. This corresponds to conversion by the block 703 in FIG. 7.

As shown in FIG. 10A, assume the case where the control target follows the moving target value from the position P1 to P2 shown in FIG. 10B in the period from time T0 to T1 during which the attitude of the control target is horizontal. At the time point where the PID control amount in a moving state is "10" as shown in FIG. 11B during the period, the control amount for use in the disturbance estimation observer process is a value obtained by subtracting the attitude difference correction amount from the total control amount. In other words, since the total control amount is a sum of the PID control amount "10" and the disturbance cancellation control amount and the attitude difference correction amount is zero, all the current total control amount is substantially used for estimation. Likewise, assume the case where the control target follows the moving target value from the position P2 to P1 shown in FIG. 10B in the period from time T0 to T1. At the time point where the PID control amount in a moving state is "−10" as shown in FIG. 11C during the period, the control amount for use in the disturbance estimation observer process is a value obtained by subtracting the attitude difference correction amount from the total control amount (a sum of the PID control amount "−10" and the disturbance cancellation control amount). In this case, since the attitude difference correction amount is zero, all the current total control amount is substantially used for estimation.

Assume the case where a change in attitude of the control target occurs in the orientation of the inclination 1 in the period from time T1 to T4 shown in FIG. 10A and the control target follows the moving target value from the position P1 to P2 at a time subsequent to time T2 shown in FIG. 10B. At the time point where the PID control amount in a moving state is "−10" as shown in FIG. 11E during the period, the control amount for use in the disturbance estimation observer process is a value obtained by subtracting the attitude difference correction amount "−20" from the total control amount (a sum of the PID control amount "−10" and the disturbance cancellation control amount). As described above, the control amount "−20" for not causing displacement in the orientation of the inclination 1 is subtracted as the attitude difference correction amount from the total control amount, and the control amount "+10" for substantially generating speed is used for disturbance estimation.

Furthermore, assume the case where the control target follows the moving target value from the position P2 to P1 shown in FIG. 10B, after time T3 at which the control target follows the stop target value at the position P2 shown in FIG. 10B, in a state where the attitude of the control target is in the orientation of the inclination 1. In this case, at a time point where the PID control amount in a moving state is "−35" as shown in FIG. 11F, the control amount for use in the disturbance estimation observer process is a value obtained by subtracting the attitude difference correction amount "−25" from the total control amount (a sum of the PID control amount "−35" and the disturbance cancellation control amount). As described above, the control amount "−25" for not causing displacement in the orientation of the inclination 1 is subtracted as the attitude difference correction amount from the total control amount, and the control amount "−10" for substantially generating speed is used for disturbance estimation.

Assume the case where a change in attitude of the control target occurs in the orientation of the inclination 2 at a time subsequent to time T5 shown in FIG. 10A and the control target follows the moving target value from the position P4 to P3 at a time subsequent to time T6 shown in FIG. 10B. In this case, at a time point where the PID control amount in a moving state is "30" as shown in FIG. 11H, the control amount for use in the disturbance estimation observer process is a value obtained by subtracting the attitude difference correction amount "20" from the total control amount (a sum of the PID control amount "30" and the disturbance cancellation control amount). The control amount "20" for not causing displacement in the orientation of the inclination 2 is subtracted from the total control amount, and the control amount "10" for substantially generating speed is used for disturbance estimation. Furthermore, assume the case where the control target follows the moving target value from the position P3 to P4 shown in FIG. 10B, after time T7 at which the control target follows the stop target value at the position P3 shown in FIG. 10B, in a state where the attitude of the control target is in the orientation of the inclination 2. In this case, at a time point where the PID control amount in a moving state is "15" as shown in FIG. 11I, the control amount for use in the disturbance estimation observer process is a value obtained by subtracting the attitude difference correction amount "25" from the total control amount (a sum of the PID control amount "15" and the disturbance cancellation control amount). The control amount "25" for not causing displacement in the orientation of the inclination 2 is subtracted from the total control amount, and the control amount "−10" for substantially generating speed is used for disturbance estimation.

In step S907 shown in FIG. 9, the CPU 101 estimates disturbance which has been lost inside the linear motor 106 from a difference between the estimated value of the thrust force expected to be generated calculated in step S906 and the estimated value of the actually generated thrust force calculated in step S905. This corresponds to the subtraction process by the adding unit 704 shown in FIG. 7. In the next step S908, the CPU 101 calculates a disturbance cancellation control amount for generating a thrust force for cancelling the disturbance estimation value calculated in step S907 therefrom. This corresponds to conversion by the block 705 shown in FIG. 7. In step S909, the CPU 101 stores the current position acquired from the position encoding processing unit 602, which is used for the next disturbance estimation observer process, in the RAM 103 to end the process. The position indicated by the stored data is used as the previous position in the next process.

For example, a description will be given of a lens position control apparatus for a camera as an exemplary application of the position control apparatus. During a photography method such as tilting, a change in attitude occurs because a user slowly pans his camera in the vertical direction. Also, during a close-up photography for photographing an object such as a flower on the ground or the like as close as possible, a change in attitude occurs because the camera may be put in a downward or upward position for a long time. Although a change in attitude slowly occurs in a cycle of a few seconds during a photographing operation, driving and stop are repeated in a high-speed cycle of a few-milliseconds during position control. Although a change in attitude while a lens serving as a movable optical component follows a moving target value, i.e., during disturbance estimation may cause an estimation offset, an estimation error can be reduced in the present embodiment. As described above, this is due to effects of subtracting the attitude difference correction amount in the preceding stop period from the total control amount, resulting in a reduction in estimation error as compared with the case where a change in attitude is not taken into account.

In the present embodiment, the control amount output for working against a change in attitude of the control target during position control to a fixing position is stored in a storage unit, and then the control amount stored in the storage unit is subtracted from the total control amount during position control for causing the control target to follow a moving target to perform disturbance estimation. Thus, since the control amount not contributing to the occurrence of speed for working against a change in attitude of the control target is removed, the likelihood of erroneous estimation due to a change in attitude is reduced, so that position servo-control can be stabilized.

(Second Embodiment)

Next, a description will be given of a second embodiment of the present invention. In the present embodiment, a description will be given of an example in which the output of a disturbance estimation observer during position control to a fixing position at a target speed of zero is stored as an attitude difference correction amount in a storage unit, and then the stored data is used for disturbance estimation during position control for causing the control target to follow a moving target at a target speed of other than zero. Components corresponding to or similar to those in the first embodiment are designated by the same reference numerals, and therefore, its explanation will be omitted. A description will be mainly given of a difference from the first embodiment.

A description will be given of the process for determining an attitude difference correction amount which can reduce the likelihood of erroneous estimation for the result of the estimated state amount even if the attitude of the control target changes with reference to FIG. 1, FIG. 6, and FIGS. 12 to 14. FIG. 12 is a flowchart illustrating the position control process executed by the CPU 101 in the block diagram of the control system shown in FIG. 6.

In step S1201, the CPU 101 acquires information about the counting state indicating as to whether the target generating unit 601 is in the increase/decrease in counting of a target value or in the suspension of counting of a target value. In the next step S1202, the CPU 101 determines whether or not the target generating unit 601 is in the suspension of counting. If the target generating unit 601 is in the suspension of counting, the process proceeds to step S1203, whereas if the target generating unit 601 is in the increase/decrease in counting, the process shifts to step S1204. In step S1203, the number of processes is set to "1" and the attitude difference correction amount is set to "0", and the process shifts to step S1204. In step S1204, the disturbance estimation observer 605 performs the disturbance estimation observer process. The details of the process will be described below with reference to FIG. 14. The process shifts to step S1205, and the CPU 101 determines whether or not the target generating unit 601 is in the suspension of counting. If the target generating unit 601 is in the suspension of counting, the process proceeds to step S1206, whereas if the target generating unit 601 is in the increase/decrease in counting, the process shifts to step S1207. In step S1206, the CPU 101 causes the attitude difference correction amount storage unit 607 to store the disturbance cancellation control amount, and then the disturbance cancellation control amount is set to "0". Then, the process shifts to step S1207.

In step S1207, the CPU 101 acquires the target value of the target generating unit 601 and the current position processed by the position encoding processing unit 602, and then, the adding unit 603 calculates a position error based on a difference between the target value and the current position. The PID compensator 604 calculates a PID control amount using the position error as input. In step S1208, the adding unit 606 sums the PID control amount and the disturbance cancellation control amount to obtain the total control amount, and outputs it to the control signal output unit 104. In step S1209, the CPU 101 stores the total control amount for the next disturbance estimation observer process in the RAM 103 to end the process.

Figure 13:
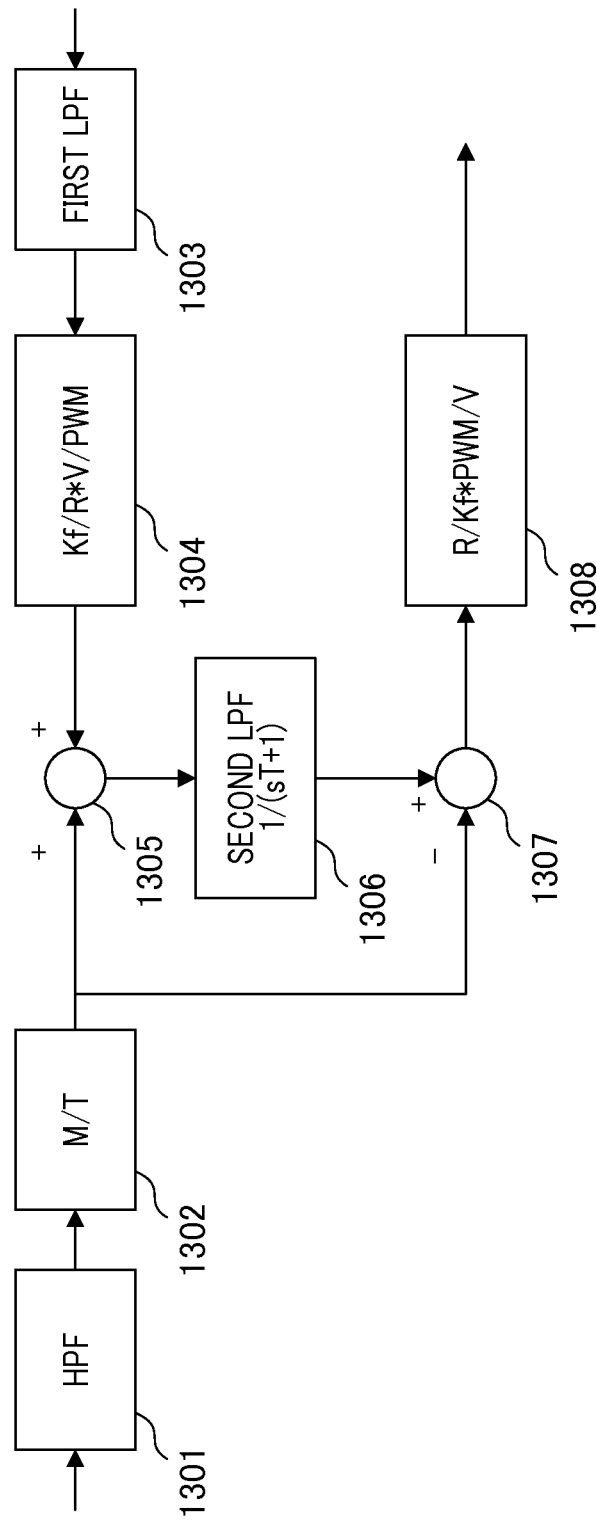
FIG. 13 is a block diagram illustrating a disturbance estimation observer according to the second embodiment.

FIG. 13 is a block diagram illustrating the detail of the disturbance estimation observer 605 according to the present embodiment. A block 1301 performs a high-pass filter (HPF) process on position information which is the output of the position encoding processing unit 602 to convert it into speed information. A block 1302 converts speed information which is the output of the block 1301 into actually generated thrust force information indicating the actual output of the linear motor 106 using the equation of motion of the speed information which is the output of the block 1301 and motor information. A block 1303 performs a low-pass filter (LPF) process (hereinafter referred to as "first LPF process") on the control amount which is the output of the adding unit 608.

A block 1304 converts the output of the block 1303 into the generated thrust force information which is derived in design from the model of the linear motor 106. The model of the linear motor 106 has the number of bit resolutions of PWM, a motor power supply voltage V, a resistance value R, and a thrust force conversion constant Kf. An adding unit 1305 sums the actually generated thrust force information output from the block 1302 and the generated thrust force information output from the block 1304 and then outputs the addition result to the block 1306. A block 1306 performs a low-pass filter process (hereinafter referred to as "second LPF process") on the output of the adding unit 1305. The term "T" is a filter time constant of a primary LPF "$1/(sT+1)$" in the second LPF process.

An adding unit 1307 calculates a difference between the output information (low-pass information) subjected to the second LPF process, which serves as a positive input, and the actually generated thrust force information output from the block 1302, which serves as a negative input. The difference is converted into the disturbance estimation result as a low frequency component of the lost disturbance thrust force. The difference is a disturbance thrust force. Thus, if the total control amount is used without considering the attitude difference in the disturbance estimation during position control for causing the control target in a tilted state to follow a moving target, all of the control amount for working against gravity without contributing to the occurrence of speed may be treated as a disturbance thrust force. Hence, in the present embodiment, the control amount, which is applied to the linear motor 106, for working against gravity due to a change in attitude is subtracted as the attitude difference correction amount from the total control amount so as not to use the control amount for disturbance estimation. A block 1308 converts the disturbance estimation result which is the output of the adding unit 1307 into a disturbance cancellation control amount for generating a thrust force corresponding to the disturbance estimation result of the low frequency component using an inverse model of the linear motor 106. The inverse model of the linear motor 106 has the number of bit resolutions of PWM, a motor power supply voltage V, a resistance value R, and a thrust force conversion constant Kf as the reciprocal of the model of the linear motor 106 shown in the block 1304.

As described above, the disturbance estimation observer estimates disturbance from the control amount applied to the linear motor 106 and the detected amount of movement so as to output a disturbance cancellation control amount for cancelling the disturbance as the lost thrust force. A description will be given of the detail of the disturbance estimation observer process with reference to FIG. 14.

FIG. 14 is a flowchart illustrating the detail of the disturbance estimation observer process in step S1204 shown in FIG. 12.

In step S1401, the CPU 101 executes the first LPF process by acquiring the previously output total control amount. This corresponds to conversion by the block 1303 in FIG. 13. In step S1402, the CPU 101 determines whether or not the current time point is in the disturbance estimation observer process cycle. For example, if the disturbance estimation observer process is performed in the same cycle as the position control cycle in the case where the disturbance estimation result is noisy in the high-pass range, the disturbance estimation observer process is executed in the 1/N cycle of the position control cycle as a countermeasure. If the timing determined in step S1402 is in the disturbance estimation observer process cycle, the process proceeds to step S1403, whereas if the timing determined in step S1402 is not in the disturbance estimation observer process cycle, the process ends.

In step S1403, the high-pass filter process is executed by acquiring the current position processed by the position encoding processing unit 602. This corresponds to conversion by the block 1301 in FIG. 13. In the next step S1404, the CPU 101 adds 1 to the number of processes. In step S1405, the CPU 101 determines whether or not the number of processes is two or more. If the number of processes is two or more, the process proceeds to step S1406, whereas if the number of processes is less than two, the process ends. In step S1406, the CPU 101 acquires the total control amount subjected to the first LPF process and the current attitude difference correction amount. In step S1407, the CPU 101 determines whether or not the target generating unit 601 is in the suspension of counting. If the target generating unit 601 is in the suspension of counting, the process shifts to step S1408, whereas if the target generating unit 601 is in the increase/decrease in counting, the process shifts to step S1409.

In step S1408, the CPU 101 sets the result of estimation of the actually generated thrust force to zero, and then the process proceeds to step S1410. In step S1409, the CPU 101 estimates speed from the position information obtained after the high-pass filter process. An actually generated thrust force which is estimated as to be actually generated is calculated based on the estimated speed and an inverse model of the linear motor 106. This corresponds to conversion by the block 1302 in FIG. 13. In step S1410, the CPU 101 estimates a thrust force expected to be generated. The thrust force expected to be generated is a generated thrust force which is expected to be generated if the control amount is applied based on the control amount obtained by subtracting the attitude difference correction amount (value stored in the storage unit 607) from the total control amount acquired in step S1406 and the model of the linear motor 106. Estimation of the thrust force expected to be generated corresponds to conversion by the block 1304 in FIG. 13.

Next, in step S1411, the CPU 101 estimates disturbance in a low frequency range. In other words, the CPU 101 estimates disturbance in a low frequency range at a time less than the time constant T, which has been lost inside the linear motor 106, from a difference between a value obtained by performing the second LPF process at the time constant T on the summed value of the estimated value of the thrust force expected to be generated and the estimated value of the actually generated thrust force and the estimated value of the actually generated thrust force. This corresponds to the process by the adding unit 1305, the block 1306, and the adding unit 1307 shown in FIG. 13. In step S1412, the CPU 101 calculates a disturbance cancellation control amount for generating a thrust force for cancelling the disturbance estimation value in the low frequency range, and the process ends. This corresponds to conversion by the block 1308 shown in FIG. 13.

As described above, even if a change in attitude of the control target occurs, the disturbance cancellation control amount in the latest stopped state is stored as the attitude difference correction amount in the storage unit 607.

In the present embodiment, the disturbance cancellation control amount output for working against a change in attitude of the control target during position control to a fixing position is stored in a storage unit, and then the disturbance cancellation control amount stored in the storage unit is subtracted from the total control amount during position control for causing the control target to follow a moving target to perform disturbance estimation. As described above, the likelihood of erroneous estimation due to a change in attitude is reduced by removing the control amount not contributing to the occurrence of speed for working against a change in attitude of the control target, so that position servo-control can be stabilized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-073948, filed on Mar. 31, 2014, which is hereby incorporated by reference wherein in its entirety.

What is claimed is:
1. A position control apparatus comprising:
a calculator configured to calculate a control amount for causing a control target to follow a target position in response to a detected position of the control target;
a control unit configured to control the control target in response to the control amount calculated by the calculator or a total control amount obtained by adding the control amount to a disturbance cancellation control amount corresponding to an amount of movement of the control target; and a storage unit configured to store an attitude difference correction amount which is a control amount for maintaining a stopped state if the control target is in the stopped state, wherein the disturbance cancellation control amount is furthermore a control amount which corresponds to a control amount obtained by computing the attitude difference correction amount stored in the storage unit from the total control amount during position control for causing the control target to follow a moving target.

2. The position control apparatus according to claim 1, wherein, in the disturbance cancellation control amount, a moving speed of the control target determined from the detected position of the control target is used as the amount of movement of the control target.

3. The position control apparatus according to claim 1, wherein the disturbance cancellation control amount is furthermore a control amount which corresponds to a control amount obtained by subtracting the attitude difference correction amount stored in the storage unit from the total control amount during position control for causing the control target to follow a moving target.

4. The position control apparatus according to claim 1, wherein, if the control target is in the stopped state, the storage unit stores the control amount calculated by the calculator as the attitude difference correction amount.

5. The position control apparatus according to claim 1, wherein, if the control target is in the stopped state, the storage unit stores the disturbance cancellation control amount as the attitude difference correction amount.

6. The position control apparatus according to claim 5, wherein if the control target is in the stopped state, the control unit controls the control target in response to the control amount output of the calculator without addition of the disturbance cancellation control amount thereto, and the disturbance cancellation control amount is a control amount calculated from the total control amount by setting the amount of movement of the control target as zero.

7. The position control apparatus according to claim 1, further comprising an actuator, wherein the control target is driven by the actuator.

8. The position control apparatus according to claim 7, wherein the actuator exerts no retaining force upon the occurrence of no thrust force.

9. The position control apparatus according to claim 1, wherein if the control target is in the stopped state, the control unit controls the control target in response to the control amount output of the calculator without addition of the disturbance cancellation control amount thereto.

10. A position control apparatus according to claim 1, further comprising an optical apparatus and an optical component in the optical apparatus that is position controlled by the position control apparatus.

11. The optical apparatus according to claim 10, further comprising an actuator, wherein the optical component is driven by the actuator.

12. The optical apparatus according to claim 10, wherein the optical component is a lens.

13. A position control apparatus according to claim 1, further comprising an imaging apparatus and an optical component in the imaging apparatus that is position controlled by the position control apparatus.

14. The optical apparatus according to claim 13, further comprising an actuator, wherein the optical component is driven by the actuator.

15. The optical apparatus according to claim 13, wherein the optical component is a lens.

16. A position control method to be executed by a position control apparatus, the method comprising:

calculating a control amount for causing a control target to follow a target position in response to a detected position of the control target;

calculating a disturbance cancellation control amount corresponding to an amount of movement of the control target;

controlling the control target in response to the calculated control amount or a total control amount obtained by adding the control amount to the disturbance cancellation control amount; and storing an attitude difference correction amount which is a control amount for maintaining a stopped state if the control target is in the stopped state, wherein the disturbance cancellation control amount is a control amount which corresponds to a control amount obtained by computing the attitude difference correction amount stored in a storage unit from the total control amount during position control for causing the control target to follow a moving target.

17. A position control apparatus comprising:

a storage configured to store an attitude difference correction amount which is a control amount for maintaining a stopped state if a control target is in the stopped state; and at least one processor or one circuitry which function as
a calculator configured to calculate a control amount for causing the control target to follow a target position based on a difference between a detected position of the control target and the target position; and a control unit configured to control the control target in response to the control amount calculated by the calculator or a total control amount obtained by adding the control amount to a disturbance cancellation control amount corresponding to an amount of movement of the control target, wherein the disturbance cancellation control amount is furthermore a control amount which corresponds to a control amount obtained by computing the attitude difference correction amount stored in the storage from the total control amount during position control for causing the control target to follow a moving target.

* * * * *